US008026931B2

(12) United States Patent
Sun et al.

(10) Patent No.: US 8,026,931 B2
(45) Date of Patent: Sep. 27, 2011

(54) DIGITAL VIDEO EFFECTS

(75) Inventors: Jian Sun, Beijing (CN); Qiang Wang, Beijing (CN); Weiwei Zhang, Beijing (CN); Xiaoou Tang, Beijing (CN); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1182 days.

(21) Appl. No.: 11/467,859

(22) Filed: Aug. 28, 2006

(65) Prior Publication Data
US 2007/0216675 A1   Sep. 20, 2007

Related U.S. Application Data

(60) Provisional application No. 60/743,503, filed on Mar. 16, 2006.

(51) Int. Cl.
*G09G 5/00* (2006.01)
*G06K 9/34* (2006.01)
(52) U.S. Cl. .......................... 345/632; 345/633; 382/164
(58) Field of Classification Search .................. 345/632, 345/633
See application file for complete search history.

(56) References Cited

U.S. PATENT DOCUMENTS

| | | | |
|---|---|---|---|
| 5,359,362 A | 10/1994 | Lewis et al. | |
| 5,719,947 A * | 2/1998 | Enomoto et al. | 382/107 |
| 6,061,476 A | 5/2000 | Nichani | |
| 6,137,919 A * | 10/2000 | Gonsalves et al. | 382/284 |
| 6,266,068 B1 * | 7/2001 | Kang et al. | 345/629 |
| 6,307,568 B1 * | 10/2001 | Rom | 345/629 |
| 6,400,831 B2 | 6/2002 | Lee et al. | |
| 6,430,523 B1 | 8/2002 | Mizokawa | |
| 6,526,395 B1 | 2/2003 | Morris | |
| 6,661,918 B1 | 12/2003 | Gordon et al. | |
| 6,714,660 B1 * | 3/2004 | Ohba | 382/103 |
| 6,760,484 B1 | 7/2004 | Sobol | |
| 6,766,299 B1 * | 7/2004 | Bellomo et al. | 704/276 |
| 6,771,303 B2 | 8/2004 | Zhang et al. | |
| 6,798,897 B1 * | 9/2004 | Rosenberg | 382/107 |

(Continued)

FOREIGN PATENT DOCUMENTS
KR         20040068432 A      7/2004

OTHER PUBLICATIONS

D. O. Gorodnichy, S. Malik, and G. Roth, "Affordable 3D Face Tracking Using Projective Vision," 2002, Proc. of Int. Conf. on Vision Interface, pp. 383-390.*

(Continued)

*Primary Examiner* — Kee M Tung
*Assistant Examiner* — Robert Craddock
(74) *Attorney, Agent, or Firm* — Lee & Hayes, PLLC

(57) ABSTRACT

Digital video effects are described. In one aspect, a foreground object in a video stream is identified. The video stream comprises multiple image frames. The foreground object is modified by rendering a 3-dimensional (3-D) visual feature over the foreground object for presentation to a user in a modified video stream. Pose of the foreground object is tracked in 3-D space across respective ones of the image frames to identify when the foreground object changes position in respective ones of the image frames. Based on this pose tracking, aspect ratio of the 3-D visual feature is adaptively modified and rendered over the foreground object in corresponding image frames for presentation to the user in the modified video stream.

20 Claims, 8 Drawing Sheets

U.S. PATENT DOCUMENTS

| | | | |
|---|---|---|---|
| 6,806,898 B1* | 10/2004 | Toyama et al. | 348/14.16 |
| 6,819,796 B2 | 11/2004 | Hong et al. | |
| 6,909,747 B2 | 6/2005 | Bordes et al. | |
| 6,937,745 B2 | 8/2005 | Toyama | |
| 6,993,163 B2 | 1/2006 | Liu et al. | |
| 7,020,305 B2 | 3/2006 | Liu et al. | |
| 7,085,401 B2 | 8/2006 | Averbuch et al. | |
| 2003/0012408 A1 | 1/2003 | Bouguet et al. | |
| 2003/0108220 A1 | 6/2003 | Jepson et al. | |
| 2003/0117485 A1* | 6/2003 | Mochizuki et al. | 348/14.01 |
| 2003/0174773 A1 | 9/2003 | Comaniciu et al. | |
| 2003/0218672 A1 | 11/2003 | Zhang et al. | |
| 2004/0125423 A1* | 7/2004 | Nishi et al. | 358/537 |

OTHER PUBLICATIONS

C. Rother, V. Kolmogorov and A. Blake, "Grabcut"—Interactive Foreground Extraction Using Iterated Graph Cuts, ACM Trans. Graphics (Proc. SIGGRAPH "04), pp. 309-314, Aug. 2004.*

AV Webcam Morpher Beta 1.0, Audio4Fun, http://www.audio4fun.com/webcam-morpher.htm, printed Apr. 17, 2006, 2 pages.

Neustaedter, et al., "Blur filtration Fails to Preserve Privacy for Home-Based Video Conferencing", University of Calgary, 42 pages.

Sun, et al., "Background Cut", Microsoft Research Asia, 14 pages.

"Video chat software turns users into live avatars", DeviceForge.com, http://www.deviceforge.com/news/NS3989092574.html, printed: Apr. 17, 2006, 5 pages.

WebCam Live! Effects—Fun effects for instant messaging and video conferencing, Creative Worldwide, http://www.creative.com/products/product.asp?category=218&subcategory=219&product . . . , printed Apr. 17, 2006, 3 pages.

Bahl, et al., "SSCH: Slotted Seeded Chanel Hopping for Capacity Improvement in IEEE 802.11 Ad-Hoc Wireless Networks", ACM, 2004, pp. 1-15.

Chang, et al., "Dynamic Channel Assignment and Reassignment for Exploiting Channel Reuse Opportunities in Ad Hoc Wireless Networks", vol. E86-B, No. 4, 2003, pp. 1234-1246.

Elson, et al., "Fine-Grained Network Time Synchronization using Reference Broadcasts", USENIX Association 2002, pp. 147-163.

Mo, et al., "Comparison of Multi-Channel MAC Protocols", ACM, 2005, pp. 1-10.

Rahimi, et al., "Reducing Drift in Parametric Motion Tracking", Proceedings Eighth IEEE International Conference on Computer Vision, ICCV, Jul. 7-14, 2001, vol. 1, 2001, pp. 315-322.

Ramani, et al., "SyncScan: Practical Fast Handoff for 802.11 Infrastructure Networks", 2005, pp. 1-10.

Raniwala, et al., "Architecture and Algorithms for an IEEE 802.11—Based Multi-Channel Wireless Mesh Network", 2005, pp. 1-12.

Raniwala, et al., "Centralized Channel Assignment and Routing Algorithms for Multi-Channel Wireless Mesh Networks", 2004, pp. 50-65.

So, et al., "A Routing Protocol for Utilizing Multiple Channels in Multi-Hop Wireless Networks with a Single Transceiver", 2004, pp. 1-10.

So, et al., "Multi-Channel MAC for Ad Hoc Networks: Handling Multi-Channel Hidden Terminals Using A Single Transceiver", ACM, 2004, pp. 1-12.

So, et al., "Practical Synchronization Techniques for Multi-Channel MAC", ACM, 2006, pp. 134-145.

Vacchetti, et al., "Stable Real-Time 3D Tracking Using Online and Offline Information", IEEE Transactions on Pattern Analysis and Machine Intelligence, vol. 26, Issue 10, Oct. 2004, pp. 1385-1391.

Vedantham, et a;., "Component Based Channel Assignment in Single Radio, Multi-Channel Ad Hoc Networks", ACM, 2006, pp. 378-389.

Wu, et al., "A New Multi-Channel MAC Protocol with On-Demand Channel Assignment for Multi-Hop Mobile Ad Hoc Networks", 2000, pp. 1-22.

Wu, et al., "SoftMAC: Layer 2.5 MAC for VoIP Support in Multi-hop Wireless Networks", 2005, pp. 1-11.

* cited by examiner

DIGITAL VIDEO EFFECTS

RELATED APPLICATION

This application claims priority to U.S. provisional patent application Ser. No. 60/743,503, titled "Digital Effects for Online Video Chat", filed on Mar. 16, 2006, and hereby incorporated by reference.

BACKGROUND

Online video chatting, video conferencing, video phone, wireless video communication, and/or so on, are very popular forms of communication. Advancements in video communication technology have enabled real-time interaction and sharing of information and documents over distances. This combination of video, voice and data creates a collaborative environment that can nearly replicate a face to face meeting. Adding digital effects to a video stream makes video communication more fun, functional, aesthetic, commercial, and/or serves other purposes.

SUMMARY

Digital video effects are described. In one aspect, a foreground object in a video stream is identified. The video stream comprises multiple image frames. The foreground object is modified by rendering a 3-dimensional (3-D) visual feature over the foreground object for presentation to a user in a modified video stream. Pose of the foreground object is tracked in 3-D space across respective ones of the image frames to identify when the foreground object changes position in respective ones of the image frames. Based on this pose tracking, aspect ratio of the 3-D visual feature is adaptively modified and rendered over the foreground object in corresponding image frames for presentation to the user in the modified video stream.

This summary is provided to introduce a selection of concepts in a simplified form, which are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

In the figures, the left-most digit of a component reference number identifies the particular figure in which the component first appears.

DETAILED DESCRIPTION

Overview

Digital video effects are described. In one aspect, systems and methods for digital video effects adaptively add digital video effects to parts of a video stream. To this end, the systems and methods identify a foreground object in the video stream and dynamically render one or more 3-D visual features over (overlay) the foreground object across respective ones of the image frames in the video stream. This is accomplished in a manner that maintains aspect ratios of the rendered 3-D visual features as the foreground object undergoes rotational or translational motion in 3-D space. In one implementation, for example, the 3-D visual feature(s) include sunglasses, a mustache, a hat, a face-mask, and/or so on. The systems and methods also allow a user to selectively alter background portions of the video stream. This is accomplished by blurring, removing, and/or replacing the background in respective ones of the image frames that comprise the video stream.

These and other aspects for digital video effects are now described in greater detail.

An Exemplary System

Exemplary systems and methodologies for digital video effects are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing contexts, acts and operations described hereinafter is implemented in hardware or other forms of computing platforms.

Figure 1:
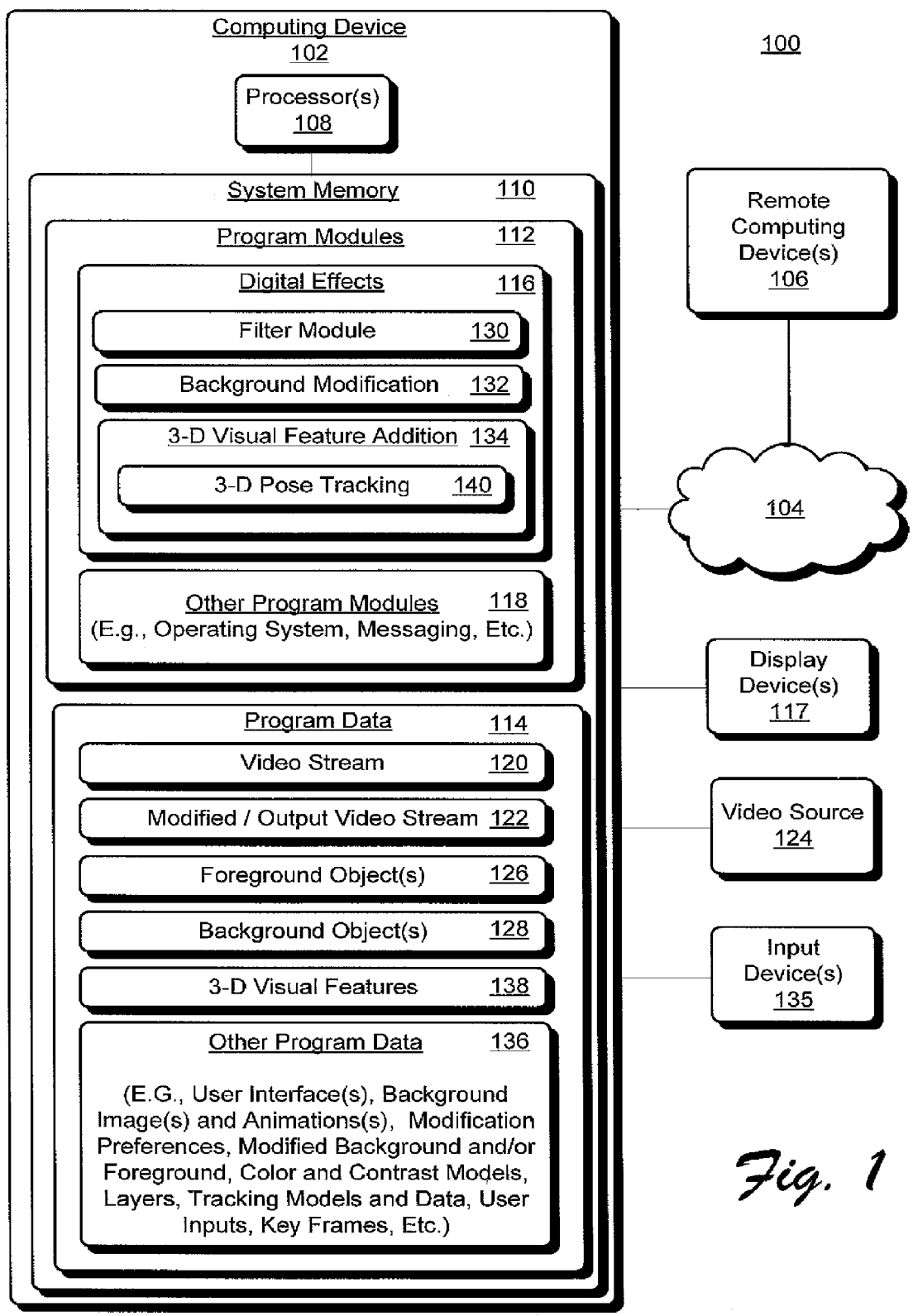
FIG. 1 shows an exemplary system for adding digital video effects, according to one embodiment.

FIG. 1 shows an exemplary system 100 for digital video effects, according to one embodiment. System 100 includes a computing device 102. Computing device 102 may be for example a general purpose computing device, a server, a laptop, a mobile computing device, and/or so on. In one implementation, computing device 102 is coupled across a network 104 to one or more remote computing devices (e.g., 106-1 to 106-N). Network 104 may include any combination of a local area network (LAN) and a general wide area network (WAN) communication environments, such as those which are commonplace in offices, enterprise-wide computer networks, intranets, and the Internet. In another implementation, computing device 102 is a standalone device that is not coupled to a remote computing device 106 over network 104.

Computing device 102 includes processor 108 coupled to system memory 110. Processor 108 may be a microprocessor, microcomputer, microcontroller, digital signal processor, etc. System memory 110 includes, for example, volatile random access memory (e.g., RAM) and non-volatile read-only memory (e.g., ROM, flash memory, etc.). System memory 110 comprises program modules 112 and program data 114. Program modules 112 include, for example, digital effects module 116 and "other program modules" 118, for example, an Operating System (OS) to provide a runtime environment, messaging applications (e.g., messengers, video chat applications, etc.) for networked communications between multiple users, etc. In one implementation, such a messaging application provides for video communications between a user of computing device 102 and a user of a remote computing device 106.

Digital effects module 116 adds digital effects to respective image frames of a video stream 120 to generate a modified video stream 122 for output and presentation to one or more users. In one implementation, such presentation is on a display device 117. In one implementation, video stream 120 represents, for example, a video stream generated by a messaging application to facilitate real-time online communications (e.g., instant messaging, video conferencing, etc.). Video stream 120, for example, may also represent video from wireless video communication, television broadcasts, movies played from storage media, live broadcasts, telecasted interviews, video received from video source 124 (e.g., a web camera, a mobile phone, etc.) coupled to computing device 102, and/or so on. Video stream 120 comprises multiple image frames, respective ones of which comprise a foreground and a background. Although different architectural configurations of digital effects module 116 could be utilized, digital video effects module 112 uses filter module 130, background modification module 132, and 3-D visual feature addition module 134 to add digital effects to respective images frames in the video stream 120.

For example, in this implementation, digital video effects module 112 employs filter module 130 to segment foreground from background in respective ones of the image frames that comprise video stream 120. This is performed to identify a respective foreground object 126 and a respective background object 128 for at least a subset of the image frames that comprise video stream 120. Exemplary operations of filter module 130 are discussed in detail below in the section titled "Exemplary Background Separation". In one implementation, a foreground object 126 represents a 3-D image of a person involved in a video communication session, although a foreground object 126 could represent other arbitrary objects.

In this implementation, digital video effects module 116 modifies background (alters, removes, replaces) a respective background object 128 across respective ones of the image frames using background modification module 132. Exemplary operations of background modification module 132 are described below in the section titled "Exemplary Background Modification". In this implementation, digital video effects module 116 adds (e.g., in real time) 3-D visual feature(s) 138 to a respective foreground object 126 across respective ones of the image frames using 3-D visual feature addition module 134. In one implementation, a 3-D visual feature 138 represents a 3-D mask, sunglasses, facial hair, and/or so on, for overlaying onto a foreground object 126 representing a person's face.

3-D visual feature addition module 134 maintains aspect ratio of overlaid 3-D visual feature(s) 138 even when foreground object 126 changes pose via rotational or translational motion (poses) in 3-D space. To accomplish this, 3-D visual feature addition module 134 utilizes a 3-D pose tracking engine (i.e., "pose tracking") 140 to track pose (e.g., position/orientation) of foreground object 126. Based on these tracked pose(s), 3-D visual feature addition module 134 dynamically modifies aspects of the 3-D visual features 138 overlying foreground object 126. Exemplary operations of 3-D visual feature addition module 134 and 3-D pose tracking engine 140 are described below in the section titled "Exemplary 3-D Pose Tracking".

Exemplary User Interface

Figure 2:
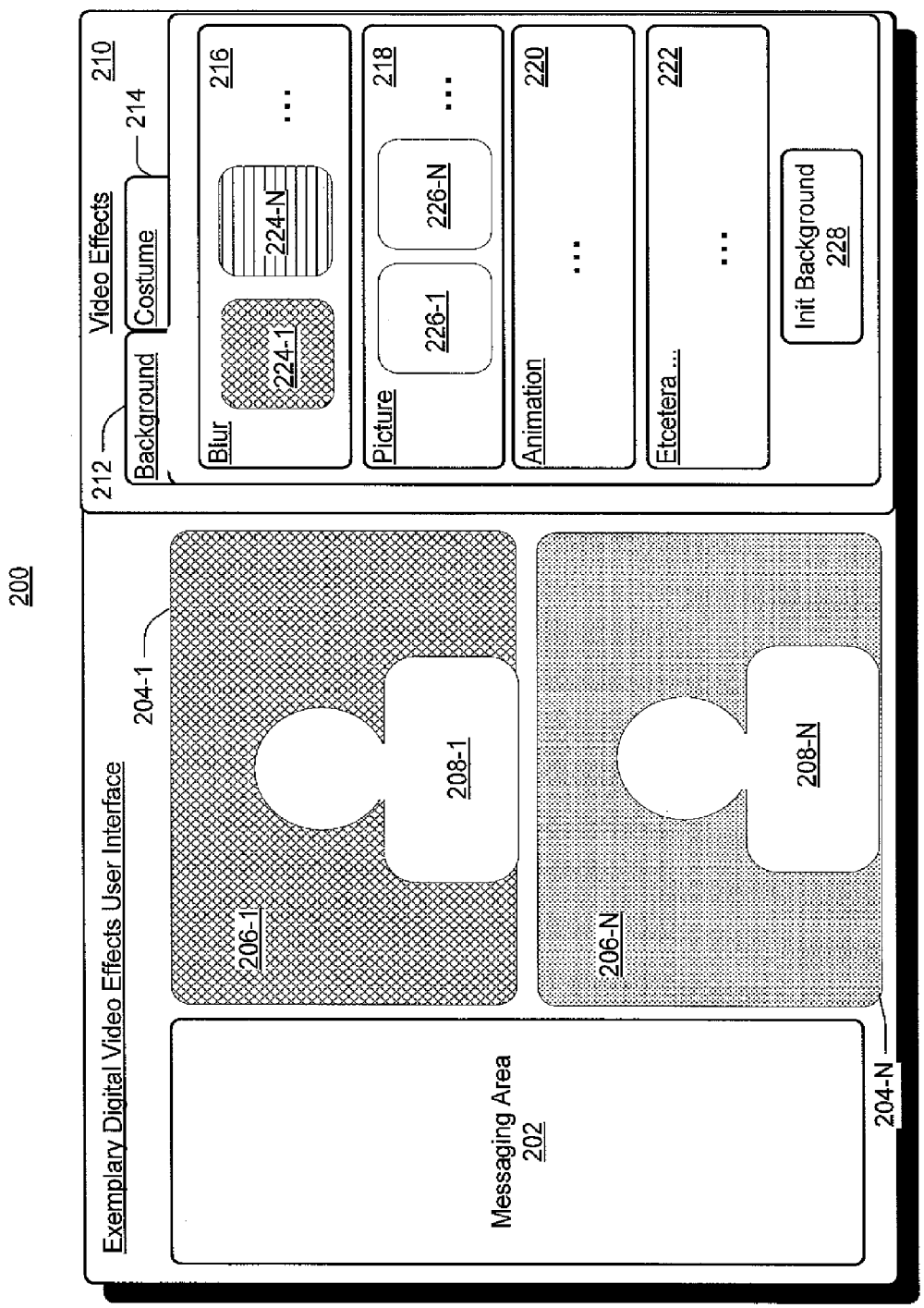
FIG. 2 shows an exemplary digital video effects user interface (UI) for modifying background of a video stream, according to one embodiment.

FIG. 2 shows an exemplary digital video effects UI 200 for modifying background of a video stream, according to one embodiment. For purposes of exemplary description and illustration, the features of UI 200 are described with respect to components of FIG. 1. In the description, the first numeral of a component indicates the particular figure where the component was first introduced. For example, the first numeral of UI 200 is a '2'. This means that UI 200 is first presented in FIG. 2.

In this example, UI 200 represents a video messaging or chat application. UI 200 includes, for example, a messaging area for users to input and receive text messages during network communications. UI 200 also includes video display areas 204 (e.g., 204-1 and 204-N) to present video stream(s) 120 (FIG. 1). In one implementation, at least one video stream 120 is generated by a video source 124 (e.g., a video camera, etc.) operatively coupled to computing device 102. In another implementation, a different video stream 120 may also be received by computing device 102 from a remote computing device 106. Each video stream 120 comprises a set of image frames. At least a subset of the image frames represent a respective background 206 (e.g., 206-1 and 206-N) and a respective foreground 208 (e.g., 208-1 and 208-N).

In this example, backgrounds 206 are shown with respective hatch and dot patterns, although it is appreciated that actual backgrounds will include background objects that are arbitrary (e.g., a function of where the video stream 120 is being generated such as in a building, outdoors, in a particular room, with a backdrop, at a rally, and/or so on). In this example foregrounds 208 are shown as respective head and torso outlines of different human beings, although it is appreciated that foreground objects can include other objects besides human beings. In this implementation, each background 206 represents a respective background object 128 (FIG. 1) from a particular image frame, and each foreground 208 represents a respective foreground object 126 from the particular image frame. As computing device 102 presents a video stream 120, respective ones of the image frames will represent respective background 128 and foreground objects 126 that may vary in translational and/or rotational space between respective image frames.

UI 200 also includes a video effects portion 210. In this example, video effects portion 210 includes a number of tabbed page UI controls for applying digital video effects to certain categories of features that may be present in the respective video streams presented in display areas 204. In this implementation, video effects 210 presents, for example, a first tabbed UI control 212 for a user to select video effects for application to a respective background 206, and a second tab UI control 214 for a user to select video effects for application to a respective foreground 208. Background tab page 212 presents several different options for a user to modify a background 206. In this implementation, these options include, for example, background blur options 216, background replacement options 218, background animation options 220, and/or other options 222.

In this implementation, a user has authority to modify background 206 of the particular display area 204 associated with the user. That is, if computing device 102 generates a video stream 120, the user of computing device 102 has authority to modify the video stream 120. Whereas in one implementation, if computing device 102 receives a video stream 120 from a remote computing device 106 (e.g., coupled across network 104 to computing device 102), the user of computing device 102 will not have authority to modify the received video stream 120.

Background blur options area 218 of UI 200 presents varying degrees of blur options (e.g., shown as bitmaps) 224 (e.g., 224-1 to 224-N) to a user for selection. These varying degrees of blur represent arbitrary degrees of blurring. For example, in one implementation, blur options 224 allow a user to specify that a background 206 is to be slightly blurred, moderately blurred, substantially blurred, completely blurred, and/or blurred according to any other blur degree. In one implementation, background modification model 132 utilizes Gaussian blur techniques to blur a background 206 based on user selection of a background blur option 224.

Background replacement area 218 presents images 226 (e.g., 226-1 through 226-N) for user selection to replace a background 206. Image(s) 226 are arbitrary and represent any type of static digital image. Background animations options area 220 presents animations (e.g., videos) for user to select to replace a background 206. In this implementation, video effects area 210 includes, for example, an init ("initialize") background UI control 228 for a user to select to apply one or more of the background modification options selected above with respect to background blur options 216, background replacement options 218, background animation options 220, and/or other options 222. Responsive to user selection of control 220, background modification module 132 implements the selected options on a background 206. In one implementation, if a user selects to replace a background with an image and also selects a degree of blur, digital effects module 112 will apply that degree of blur to the replacement image for presentation to the user, etc.

Figure 3:
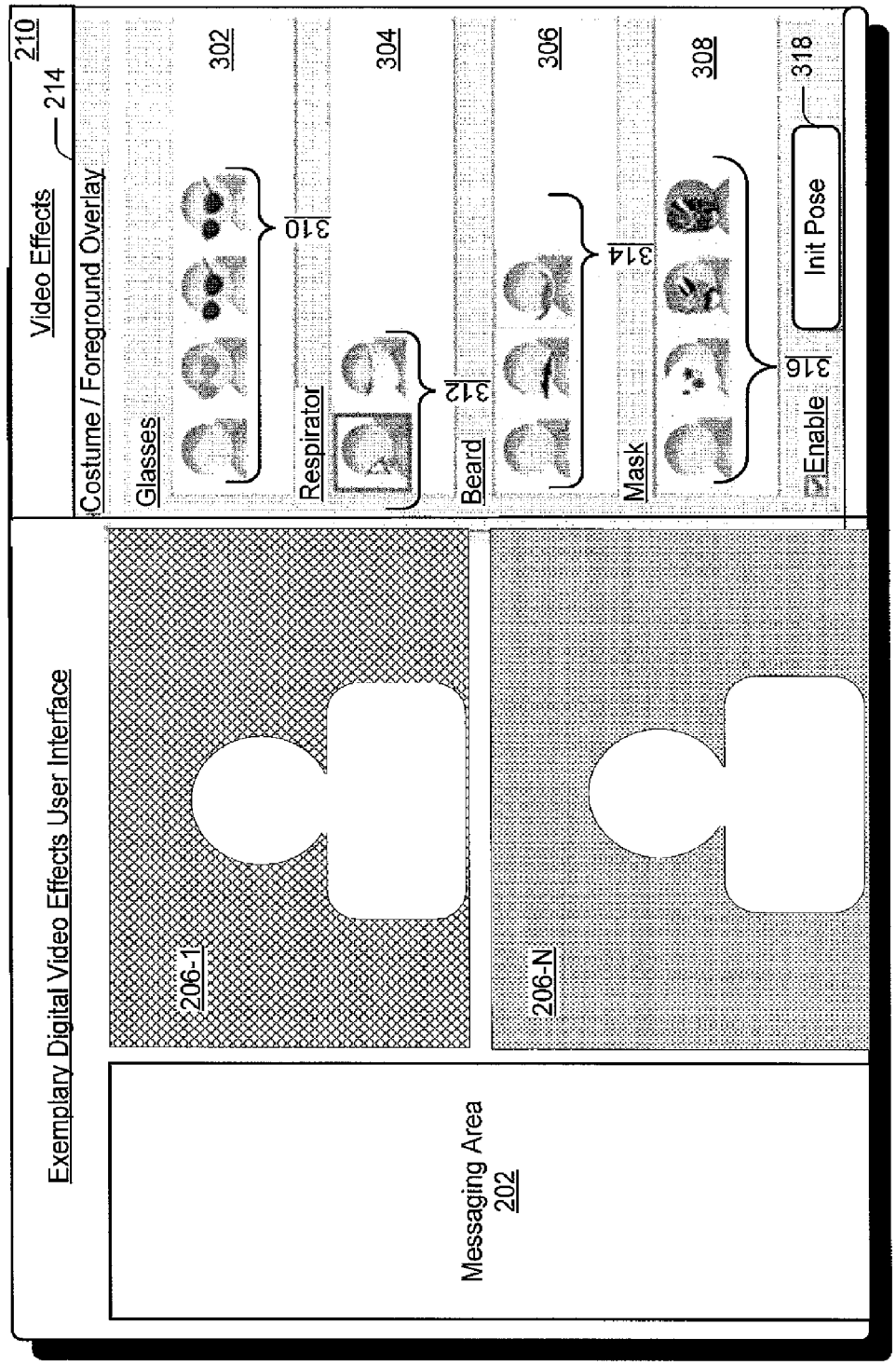
FIG. 3 shows an exemplary digital video effects UI for modifying foreground of a video stream, according to one embodiment.

FIG. 3 shows exemplary digital video effects UI 200 for modifying a foreground of a video stream, according to one embodiment. For purposes of exemplary description and illustration, the features of UI 200 are described with respect to components of FIGS. 1 and 2. In this example, UI 200 represents a video messaging or chat application, although one or more aspects of UI 200 can be implemented in other types of applications (e.g., VTC, and/or other applications). In this example, UI 200 includes, for example, video display areas 204 (e.g., 204-1 and 204-N) to present video streams 120 (FIG. 1) to facilitate network communications between two or more users. Each video stream 120 includes a respective background 206 (e.g., 206-1 and 206-N) and a respective foreground 208 (e.g., 208-1 and 208-N). Video effects portion 210 emphasizes aspects of "costume" or foreground "overlay" UI control 214 for a user to select video effects and modify a foreground 208 associated with a video stream 120.

In this implementation, "costume/overlay" page 214 presents one or more options 302 through 308 for a user to modify a foreground 208 with one or more visual features. Foreground 208 represents a foreground object 126 of FIG. 1, and such visual features represent 3-D visual features 138 (also of FIG. 1). In this implementation, these options include, for example, glasses options 302, respirator options 304, beard (or facial hair) options 306, mask options 308, and/or other options. It is appreciated that although this example of UI 200 presents costume/foreground overlay options 302 through 308, any other arbitrary type of costume/overlay could also be provided for user selection to modify a foreground 208. For instance, these costume/overlay options are directed to overlaying facial ad/or head features of a foreground representing facial features of a human being. Other types of options could also be present such as hats, clothing, and/or so on. Additionally, when foreground 208 does not represent a human, these options can change accordingly to apply to the particular type of foreground 208 being presented. For example, if the foreground object represents an automobile, an overlay option may be a hubcap for a wheel, a paint color and/or decals for the auto, etc.

In this implementation, costume/foreground overlay section 214 also includes, for example, an init ("initialize") pose UI control 318 for a user to select, and thereby, apply one or more of selected foreground modification options (e.g., options presented in UI areas 302 through 308). Responsive to user selection of control 318, 3-D visual feature addition module 134 overlays the selected option(s) on a foreground 208. As indicated above, and as described in greater detail below in the section titled ", the digital effects module 116 maintains aspect of overlain 3-D visual features as the foreground 208 (i.e., representing foreground object 126) undergoes rotational or translational motion in 3-D space. Aspects of 3-D pose tracking are described in greater detail below the section titled "Exemplary 3-D Pose Tracking".

In one implementation, at least a subset of video stream 120 modifications (e.g., those described above and below with respect to UI 200 with respect to FIGS. 2 and 3) are based on inputs received from a user. In another implementation, pre-configured settings (e.g., preferences, etc) are used to direct digital effects module 112 of modifications to apply to a video stream 120.

Exemplary Background Separation

Filter module 130 of FIG. 1 extracts background 128 from frame(s) of video stream 120. In one implementation, filter module 130 combines background subtraction with color and contrast models (shown as a respective portion of other program data 136) to extract a foreground layer or a foreground object 126 from an image I in a video sequence using a known background image $I_B$. A foreground object lies in a foreground layer. A foreground layer may contain on or more foreground objects. In one implementation, the image I is an image frame in the input video stream 120 and the known background image $I_B$ is provided by the user.

More particularly, in one implementation, filter module 130 extracts a foreground layer as follows. Filter model 130 assigns a unique label $x_r$ to each pixel r of the image I so that $$x_r \in \{\text{foreground}(r=1), \text{background}(r=0)\} \quad (1)$$

Labeling variables $X = \{x_r\}$ are obtained by minimizing Gibbs energy E(X) given by:

$$E(X) = \sum_{r \in \upsilon} E_1(x_r) + \lambda \sum_{(r,s) \in \varepsilon} E_2(x_r, x_s) \quad (2)$$

where, $\upsilon$ is a set of all pixels r in I, $\varepsilon$ is a set of all adjacent pixel pairs (r, s) in I, $E_1(x_r)$ is a color model, $E_2(x_r, x_s)$ is a contrast model and $\lambda$ is a parameter to balance influences of the two models.

In one implementation, the color model $E_1(x_r)$ is a combination of a background color model or basic model and a foreground color model stored in color models. Both models are represented by spatially global Gaussian Mixture Models (GMMs). The background color model or basic model is represented as a mixture of a global background color model and a per-pixel color model learned from the known background image $I^B$. The global background color model is represented as:

$$p(I_r \mid x = 0) = \sum_{k=1}^{K_b} w_k^b N\left(I_r \mid \mu_k^b, \Sigma_k^b\right) \quad (3)$$

where, N(•) is a Gaussian distribution and ($w_k^b$, $\mu_k^b$, $\Sigma_k^b$) represents the weight, the mean color and the covariance matrix of the kth component of the background GMMs. In one implementation, the value of $K_b$ ranges from 10 to 15 for the background. A per-pixel single isotopic Gaussian distribution $p_B(I_r)$ is also used to model the background color model or basic model:

$$p_B(I_r) = N(I_r | \mu_r^B, \Sigma_r^B) \quad (4)$$

where, $\mu_r^B = I_r^B$ and $\Sigma_r^B = \sigma_r^2 I$. The per-pixel variance $\sigma_r^2$ is learned from a background initialization phase.

In view of the above, the background color model or basic model is represented as:

$$p_{mix}(I_r) = \alpha \cdot p(I_r | x=0) + (1-\alpha) \cdot p_B(x_r) \quad (5)$$

where, $\alpha$ is a mixing factor. The mixing factor is set to a fixed value or it may be an adaptive variable depending on the degrees of separation between background colors and foreground colors. If the background colors and the foreground colors are well separated, the adaptive model relies more on the global color model, otherwise it relies on both the global and per-pixel color models.

In one implementation, the global foreground color model GMM is learned from the image I by background subtraction. In background subtraction, pixels that have a very low background probability are marked as "definitely foreground". Then the color value $I_r$ of image I is defined as:

$$I_r = \begin{cases} B & p_B(I_r) > t_b \\ F & p_B(I_r) < t_f \\ U \end{cases} \quad (6)$$

where, $t_b$ and $t_f$ are background and foreground thresholds respectively, B, F and U represents "definitely background", "definitely foreground" and "uncertainty region", respectively. The global foreground color model $p(I_r | x_r = 1)$ is then learned from the pixels in F. For temporal coherence, pixels are also sampled from the intersection of F and the labeled foreground region.

The color model $E_1$ can therefore be defined as:

$$E_1(x_r) = \begin{cases} -\log p_{mix}(I_r) \\ -\log p(I_r | x_r = 1) \end{cases} \quad (7)$$

$$x_r = 0$$
$$x_r = 1$$

where, $p_{mix}(I_r | x_r = 0)$ is the background color model or basic model (mixture of global color model and per-pixel color model learned from the known background image $I^B$) and $p(I_r | x_r = 1)$ is the foreground color model.

In one implementation, to determine the separation between the background color GMM and the foreground color GMM, an approximation of Kullback-Liebler (KL) divergence between the two GMMs is adopted by filter module 130. In this implementation, the divergence is given by:

$$KL_{fb} = \sum_{k=0}^{K} w_k^f \min_i \left( KL\left(N_k^f \| N_i^b\right) + \log \frac{w_k^f}{w_i^b} \right) \quad (8)$$

where, $N_k^f$ and $N_i^b$ are kth component of the foreground GMMs and ith component of the background GMMs respectively. The KL divergence between $N_k^f$ and $N_i^b$ is computed analytically.

Using equation 8, an adaptive mixture for the background color model is represented as follows:

$$p'_{mix}(I_r) = \alpha' p(I_r | x = 0) + (1 - \alpha') p_B(I_r) \quad (9)$$

where, $$\alpha' = 1 - \frac{1}{2} \exp(-KL_{fb} / \sigma_{KL}) \quad (10)$$

where, $\sigma_{KL}$ is a parameter to control the influence of $KL_{fb}$. If the foreground and background colors are well separated, i.e., $KL_{fb}$ is large, the mixing factor $\alpha'$ is set to be large and relies more on the global background color model. Otherwise, $\alpha'$ is set to be small, to use both background and per-pixel background color models. In one implementation, $\alpha'$ is greater than or equal to 0.5.

In yet another implementation, a basic contrast model for two adjacent pixels r and s, is represented as:

$$E_2(x_r, x_s) = |x_r - x_s| \cdot \exp(-\beta d_{rs}) \quad (11)$$

where, $d_{rs} = \|I_r - I_s\|^2$ is a $L_2$ norm of the color difference called contrast, $\beta$ is a robust parameter that weighs the color contrast and is set to $$\beta = (2 \langle \|I_r - I_s\|^2 \rangle)^{-1}$$

is a parameter that weighs the color contrast, where $\langle \rangle$ is the expectation operator.

However, when the image contains background clutter, notable segmentation errors are obtained around the boundary using the background model or basic model. Hence, an adaptive background contrast attenuation model is used to adaptively and dynamically attenuate contrasts in the background while preserving the contrasts across foreground/background boundaries. This method is based on the observation that the contrast from background is dissimilar to the contrast caused by foreground/background boundaries in most cases. By adaptive background contrast attenuation, most contrasts from background are removed while contrasts caused by foreground/background boundaries are preserved. Using this attenuated contrast method, the foreground layer is extracted from a cluttered background.

To adaptively perform background contrast attenuation, in one implementation, the contrast term ($d_{rs}$) in equation (11) is replaced by $$d''_{rs} = \|I_r - I_s\|^2 \cdot \frac{1}{1 + \left(\frac{\|I_r^B - I_s^B\|}{K}\right)^2 \exp\left(-\frac{z_{rs}^2}{\sigma_z}\right)} \quad (12)$$

where, K is a constant to control the strength of attenuation $z_{rs}$ measures the dissimilarity between pixel pair ($I_r$, $I_s$) in the image I, ($I_r^B$, $I_s^B$) in the known background image $I^B$ and $\exp(-z_{rs}^2/\sigma_z)$ is the attenuation strength. As indicated by equation 12, a small $z_{rs}$ value leaves more contrasts in the image and a large K value decreases the attenuation strength. In one implementation, stable segmentation results is obtained when K and $z_{rs}$ are set to a value in the range (2.5, 10) and (5, 20) respectively.

In another implementation, $z_{rs}$ may be determined by a Hausdorff distance-like definition such as $$z_{rs} = \max\{\|I_r - I_r^B\|, \|I_s - I_s^B\|\} \quad (13)$$

In yet another implementation, to handle large luminance changes in the background image, $z_{rs}$ may be measured as $$z_{rs} = \|\vec{V}(I_r, I_s) - \vec{V}(I_r^B, I_s^B)\| \tag{14}$$

where, $\vec{V}(a,b)$ is a vector from point "a" to point "b" in RGB color space.

In one implementation, filter module 130 compensates for various changes in background 128, to maintain a background during the video communication, based on the adaptive mixture for the background color model given in equation 9. The changes in background 128 may be, for example, gradual or sudden luminance change, movement in background, sleeping or waking object in the background and casual camera shaking, In one implementation, filter module 130 compensates for luminance change by computing a histogram transformation function between histogram for background in the image I and histogram for the known background $I^B$. In case of small luminance changes, the known background $I^B$ is directly updated by the histogram transformation function. In case of large luminance change, the following series of steps are carried out.

Before segmentation of the image I, the known background image $I^B$ is updated by the histogram transformation function and the global background color model is rebuilt. Foreground threshold $t_f$ is increased to $3t_f$ and a background uncertainty map given by $U^B = \{u_r^B = 1\}$ is initialized. The adaptive mixture for the background color model given in equation 9 is modified as follows:

$$p'_{mix}(I_r|x=0) = \alpha' p(I_r|x=0) + (1 - u_r^B)(1 - \alpha^1) p_B(I_r) \tag{15}$$

After segmentation of the image I, color, variance, and uncertainty of each labeled background region is updated using the following equations:

$$I_{r,t}^B = (1-\rho) I_{r,t}^B + \rho I_{r,t} \tag{16}$$

$$\sigma_{r,t}^2 = (1-\rho) \sigma_{r,t}^2 + \rho (I_{r,t} - I_{r,t}^B)^T (I_{r,t} - I_{r,t}^B) \tag{17}$$

$$u_r^B = (1-\rho) u_r^B + \rho (1 - \exp(-\|I_{r,t} - I_{r,t}^B\|/2\sigma_{r,t}^{-2})) \tag{18}$$

where, $\rho = \beta N(I_{r,t}|I_{r,t}^B, \sigma_{r,t}^2)$ and $\beta$ is the learning rate. In one implementation, $\beta$ is set to a value 0.2.

Movement in background 128 may be dealt with in different ways. In one implementation, if background and foreground colors are well separated, the adaptive mixture for the background color model self adjusts to rely on the global background color model. In another implementation, if there is no intersection between a moving object in the background and the identified foreground object 126, the biggest connected component in the segmentation result of image I is treated as a part of the identified foreground object 126. Else, the moving object may be treated as the identified foreground object 126.

In one implementation, if there is no intersection between the object(s) and the identified foreground object 126, objects that are sleeping or waking in the background 128 are absorbed into the background. Further, if pixels corresponding to the objects are labeled as a part of background 128 for a sufficient time, then these pixels may be absorbed into background 128 by updating the known background image $I^B$ using equations 16, 17 and 18, as described above.

In case of casual camera shaking, filter module 130 detects camera translation between current and previous image frames. In one implementation, if the translation is small, a Gaussian blur is applied and the weight of the per-pixel model is decreased. For example, if the translation is less than 4 pixels a Gaussian blurred background image of standard variance 2.0 may be applied and the weight of the per-pixel model may be decreased. In another implementation, if the translation is large, the per-pixel model is disabled.

Exemplary Background Modification

Figure 4:
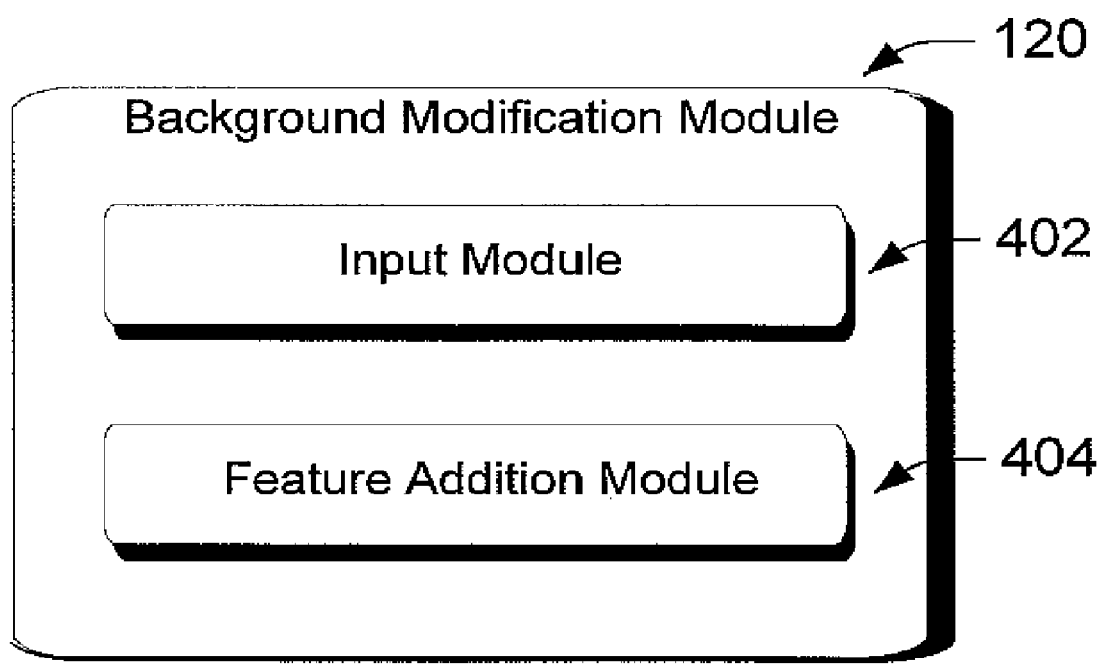
FIG. 4 shows an exemplary background modification module for digital video effects, according to one embodiment.

FIG. 4 shows an exemplary background modification module 132 for video digital effects, according to one embodiment. For purposes of exemplary illustration and description, the operations of background modification module 132 are described with respect to components of FIGS. 1 and 2. To this end, background modification module 132 receives background 128 of the input video stream 120 from filter module 130. The illustrated configuration of the exemplary background modification module 132 is meant to provide only one example arrangement for the sake of overview. Many other arrangements of the illustrated components, or similar components, are possible within the scope of the subject matter. In this example, background modification module 132 includes an input module 402 which receives background 128 from filter module 130. Background modification module 132 also includes a feature addition module 404 which adds visual features to the received background 128, for example, as described above with respect to FIG. 2. for purposes of exemplary illustration, a modified background 128 is shown as respective portion of "other program data" 136.

Exemplary 3-D Pose Tracking

Figure 5:
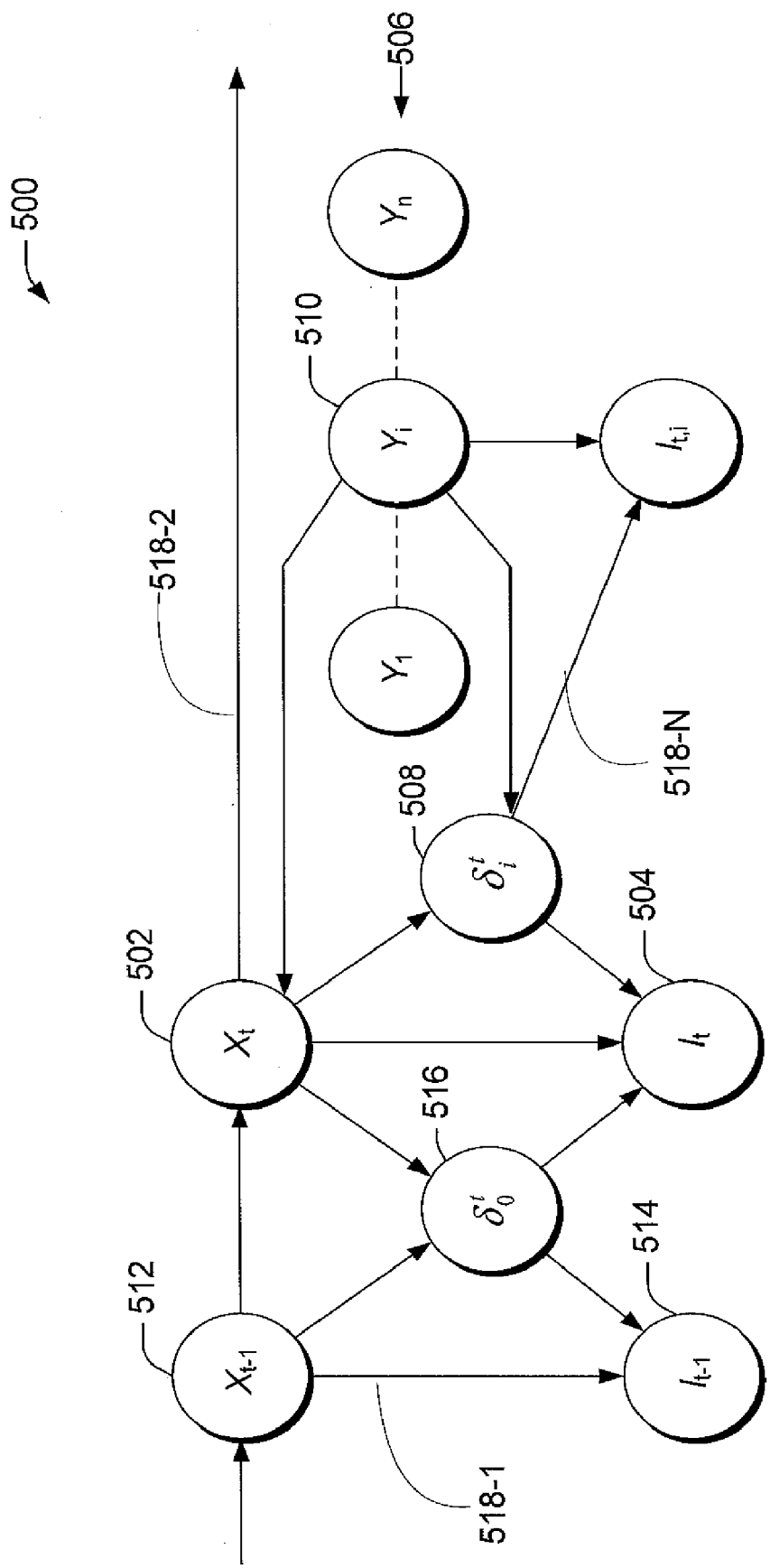
FIG. 5 shows an exemplary Bayesian network for three-dimensional (3-D) pose tracking for digital video effects, according to one embodiment.

FIG. 5 shows an exemplary Bayesian network 500 for 3-D differential pose tracking to add video digital effects to a video stream, according to one embodiment. For purposes of exemplary illustration and description, the operations of the Bayesian network 500 are described with respect to components of FIGS. 1 through 4. 3-D Visual feature addition module 134 (FIG. 1) utilizes exemplary Bayesian network 500 for 3-D differential pose tracking to add video digital effects to video stream 120. Bayesian network 500 is represented as a directed graph where nodes (e.g., nodes 502 through 516) of the graph represent variables, and edges (e.g., 518-1 through 518-N) of the graph represent dependence relations among the variables. Bayesian network 500 is a representation of joint distribution over all variables represented by nodes in the graph. In this implementation, state of foreground object 126 (a current pose) of FIG. 1 at time t is represented as $X_t$ 502 and corresponding image observation is represented as $I_t$ 504. The sequence of states and observations up to time t are denoted by $X_t = \{X_1, \ldots, X_t\}$ and $I_t = \{I_1, \ldots, I_t\}$.

Tracking at time t is regarded as an inference problem of a posterior distribution $P(X_t|I_t)$. At time t, 3-D Visual feature addition module 134 selects a set of key-frames $\{(Y_1, \ldots, Y_n)\}$ 506, where $\{I_{t,1}, \ldots, I_{t,n}\}$ is its corresponding image observation. The node $\delta_u^t$ denotes a inter-frame pose 508, i.e., the differential state representing the relative pose between pose state $Y_i$ 510, and the object state (current pose) $X_t$ 502. For purposes of exemplary illustration, such key frames are shown as a respective portion of "other program data" 136. For conciseness, the previous frame is denoted as the 0th key-frame so that $Y_0$ equals $X_{t-1}$ 512. $I_{t,0}$ equals $I_{t-1}$ 514 and the corresponding differential state is $\delta_0^t$ 516. The Bayesian dynamical graphical model 500 and its joint distribution can then be specified as follows by Equation (19):

$$P(X_t, \{Y_i\}, \{\delta_i^t\}, I_t) = \tag{19}$$

$$P(X_t | \{Y_i\}) P(I_t, \{I_{t,i}\} | X_t, \{Y_i\}, \{\delta_i^t\}) \prod_{i=0}^{n} P(\delta_i^t | X_t, Y_i) Q(Y_i)$$

$P(X_t|\{Y_i\})$ represents a dynamical model that predicts the current pose $X_t$ 502 from the key-frame pose. $P(I_t,\{I_{t,i}\}|X_t,\{Y_i\},\{\delta_i^t\})$ represents an observation model, which measures the image likelihood given all the pose states. $P(\{\delta_i^t\}|X_b,Y_i)$ models the density of the differential pose. $Q(Y_i)$ represents posteriors of a pose state in a previous frame or key-frames, which are assumed known at the current time t.

Graphical model 500 generalizes the 5-D pose tracking methodology implemented by 3-D visual feature addition module 134. The graphical model 500 also accounts for the uncertainties in the previous tracking result and in the key-frames by estimating the probability that a given position is the actual current position of a tracked facial feature from past states of the facial feature and from related probabilities of related facial features.

Figure 6:
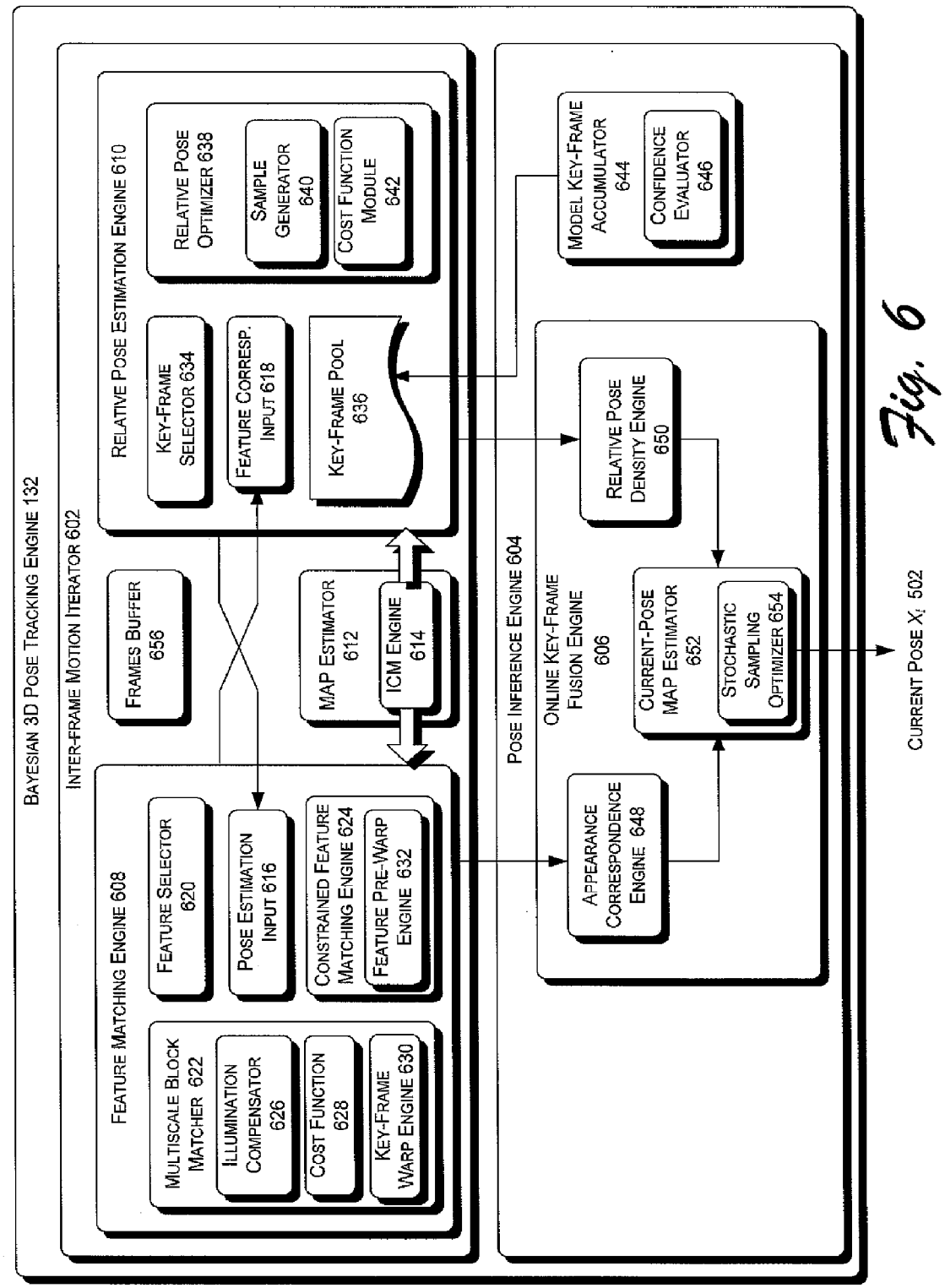
FIG. 6 is a block diagram of an exemplary Bayesian 3-D pose tracking engine for digital video effects, according to one embodiment.

FIG. 6 shows an exemplary illustration of a 3-D pose tracking engine 140 (see also FIG. 1) for adding digital effects to a video stream, according to one embodiment. For purposes of exemplary illustration and description, the operations of the 3-D pose tracking engine 140 are described with respect to components of FIGS. 1 through 5. Although 3-D pose tracking engine 140 is described with respect to certain architecture and certain components, it can be appreciated that this description is but one exemplary way to implement 3-D pose tracking engine 140, and other architectures and components could be utilized.

In one implementation, the 3-D pose tracking engine 140 receives video (e.g. video stream 120 of FIG. 1), for example live captured video as input and tracks a foreground object's 3-D pose in real-time. In this example, 3-D pose tracking engine 140 includes an inter-frame motion inference engine ("inter-frame motion iterator") 602 and a pose inference engine 604. The inter-frame motion iterator 602 estimates or infers a differential pose density, i.e., both relative pose estimation and feature matching estimation. The inter-frame motion iterator 602 determines the change in pose of an object between frames of a video stream 120, using two independent techniques namely a relatively independent feature matching technique and a pose estimation technique. Pose inference engine 604 includes an online key-frame fusion engine 606 that fuses the output of the two independent techniques employed in the inter-frame motion iterator 602 to obtain a current pose, i.e., $X_t$ 502 in FIG. 5.

In this implementation, inter-frame motion iterator 602 includes feature matching engine 608 and relative pose estimation engine 610 to perform the aforementioned two relatively independent feature matching and pose estimation techniques. The inter-frame motion iterator 602 includes a Maximum a Posteriori (MAP) estimator 612 and an Iterated Conditional Modes (ICM) Engine 614. The ICM Engine 614 performs iterations to obtain the MAP estimation of relative pose densities. Iterations alternate back and forth between the feature matching engine 608 and the relative pose estimation engine 610. With each such iteration, feature matching values or relative pose values from either engine 608 or 610 become starting material for the other engine in a "hill-climbing" technique. Thus, a pose estimation input 616 receives the latest value from the relative pose estimation engine 610 and a feature correspondence input 618 receives the latest value from the feature matching engine 608.

In this implementation, feature matching engine 608 includes a feature selector 620, a multiscale block matcher 622, and a constrained feature matching engine 624. The multiscale block matcher 622 includes an illumination compensator 626, a cost function 628, and a key-frame warp engine 630. In this implementation, constrained feature matching engine 624 includes a feature pre-warp engine 632.

In this implementation, relative pose estimation engine 610 includes a key-frame selector 634, a key-frame pool 636, and a relative pose optimizer 638, that includes a sample generator 640 and a cost function module 642. In this implementation, pose inference engine 604 includes the online key-frame fusion engine 606 and a model key-frame accumulator 644 that includes a confidence evaluator 646.

The online key-frame fusion engine 606 includes an appearance correspondence engine 648, a relative pose density engine 650, and a current-pose MAP estimator 652. The online key-frame fusion engine 606 obtains the current pose $X_t$ 502 as in FIG. 5 via a stochastic sampling optimizer 654. The exemplary 3-D pose tracking engine 140 may also include support components, such as a frame buffer 656 to store a current frame and previous frames of a video stream.

Exemplary operations of the exemplary Bayesian 3-D pose tracking engine 140 are now be described in greater detail.

Figure 7:
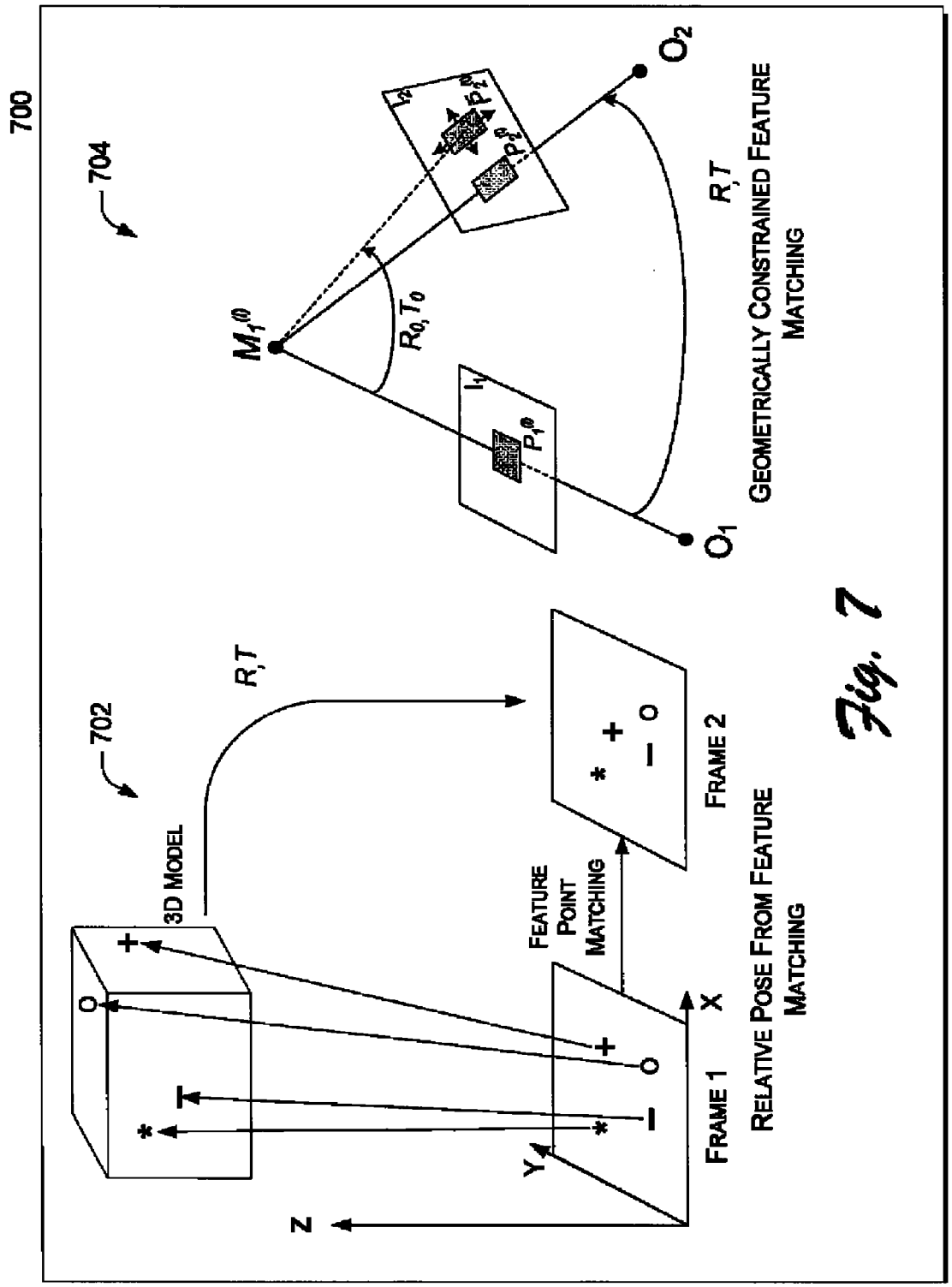
FIG. 7 shows a diagram of exemplary relationships between relative pose estimation and exemplary feature matching for digital video effects, according to one embodiment.

FIG. 7 shows an interrelation between feature matching and relative pose estimation for digital video effects, according to one embodiment. The inter-frame motion iterator 602 (FIG. 6) represents motion between two frames of video stream 120 (FIG. 1) jointly, as inter-frame feature matching and relative pose estimation are closely coupled. The interrelation 700 includes relative pose estimation 702 and feature matching 704 that may use rough relative pose estimates and feature matching information, respectively. The feature matching 704 is made easier and more reliable by narrowing baseline of two feature windows, once provided with rough relative pose estimates. Thus, the processes of a relative pose estimating 702 and inter-frame features matching 704 may optimize each other over several iterations. Consequently, the inter-frame motion iterator 602 performs feature matching and relative pose estimation iteratively, as now described.

In one implementation of the Bayesian 3-D pose tracking engine 140, the inter-frame motion iterator 602 denotes the previous frame and the current frame as $I_1$ and $I_2$, respectively; The pose state in $I_1$ is $[R_1|T_1]$ where $R_1$ is the rotation matrix and $T_1$ is the translation vector. To calculate the relative pose state $[R|T]$ between $I_1$ and $I_2$, some features $P_1$ for tracking are selected from $I_1$. Since the pose $[R_1|T_1]$ is assumed to be known in the previous frame, $P_1$ is back-projected to the 3-D model as shown in relative pose estimation 702 to get the corresponding 3-D points, $M_1$. By denoting the correspondences of features $P_1$ in frame $I_2$ as "$P_2$" the joint posterior distribution of point matching and relative pose given current observation is defined in Equation (20):

$$P(P_2,R,T|I_1,I_2,M_1) \qquad (20)$$

The above joint distribution has high dimensionality and non-linearity, but two conditional distributions of the joint distribution are effectively modeled.

A first conditional distribution in Equation (13) is $P(R, T|I_1, I_2, M_1, P_2)$, which is the distribution of the relative pose given the correspondences between 3-D model points and 2D image features. In one implementation, the relative pose estimation engine 610 can model the distribution as in Equation (21)

$$P(R,T)|I_1,I_2,M_1,P_2) = P(R,T|M_1P_2) \propto \exp\left(-\sum_i (e_i^2/2\sigma^2)\right) \qquad (21)$$

where, ρ(•) is a robust function as in Equation (15):

$$\rho(r) = \begin{cases} r & r < T \\ 2T & r \geq T \end{cases} \quad (22)$$

where, T is a threshold, and $e_i$ is the re-projection residue on the image, as in Equation (23):

$$e_i^2 = \|P_2^{(i)} - A[R|T]M_1^{(i)}\|^2 \quad (23)$$

$P_2^{(i)}$, $M_1^{(i)}$ is the i-th point of $P_2$ and $M_1$, respectively, and A is a internal parameters matrix of the video source for example a camera which is obtained offline in advance.

Another conditional distribution is P ($P_2|I_1, I_2, M_1, R, T$), which is the distribution of the matching features $P_2$ in image $I_2$ given the 3-D model points and pose estimation. In one implementation, the feature matching engine 608 can model this distribution as in Equation (24):

$$P(P_2 \mid I_1, I_2, M_1, R, T) \propto \exp\left(-\sum_i e_i^2 - \lambda \sum_i f_i^2\right) \quad (24)$$

In Equation (24), $e_i$ is the geometric constraint term as defined in Equation (23), and λ is a weight coefficient. The term $f_i$ is the appearance constraint, defined as follows in Equation (25):

$$f_i^2 = \sum_j \|c_2^{(i)} * I_1(W_i(p_2^{(i,j)})) - c_1^{(i)} * I_2(p_2^{(i,j)})\|^2 \quad (25)$$

where, $W_i(\bullet)$ is a 2D projective warping which is directly determined by the relative pose R, T, 3-D points $M_1^{(i)}$, and its corresponding mesh normal. The term $p_2^{(i,j)}$ is the coordinate of the j-th pixel in a window centered at $P_2^i$. This window is used for image feature matching. For illumination compensation, the terms $c_1^{(i)}$ and $c_2^{(i)}$ are averaged intensity level of the correlation windows used in $I_1$ and $I_2$, respectively.

In one implementation of the MAP estimator 612, given the two modeled conditionals just described above, the ICM engine 614 obtains the MAP estimation of $P_2$, and R, T via ICM. This is a flexible inference technique that uses a "greedy" strategy in the iterative local minimization, and so convergence is typically guaranteed after only a few iterations. In one implementation, the ICM engine 614 performs its iterations in steps according to the following framework:
1. Initialize $P_2^0$ through generic feature matching; set i=1.
2. $(R^{(i)}, T^{(i)}) \leftarrow \arg\max_{R,T} (P(R, T|I_1, I_2, P_2^{(i-1)}, M_1))$
3. $P_2^{(i)} \leftarrow \arg\max_{P_2} (P(P_2|I_1, I_2, M_1, R^{(i)}, T^{(i)}))$
4. If no convergence, then set i=i+1; go to step 2.

Multiscale block matcher 622, e.g., with an illumination compensator 626, performs the generic feature matching (step 1). In the event of wide baseline matching, which typically occurs between key-frame and current frame, the key-frame warp engine 630 may first warp the image feature in the key-frame to the position at the previous frame, and then the multiscale block matcher 622 performs the multiscale feature matching to the current frame. In one implementation, the iterations of the ICM engine 614 may use two optimizations, one in each of steps 2 and 3 above. These will now be described.

Relative Pose Optimization

In one implementation, relative pose optimizer 638 maximizes probability in Equation (21) (for example, step 2 above performed by ICM engine 614) by minimizing cost function module 642, which in one implementation is a negative log of the posterior in Equation (14), as shown here in Equation (26):

$$C(R, T) = \sum_i \rho(e_i^2 / 2\sigma^2) \quad (26)$$

In one implementation, relative pose optimizer 638 employs a standard stochastic optimization approach. Using feature pairs set $\{P_2^{(i)}, M_2^{(i)}\}$ sample generator 640 produces a number of samples, each sample generated by randomly selecting a minimum set of point pairs that can recover the relative pose R, T. The cost function in Equation (26) can thus be evaluated and the [R|T] associated with the sample of minimum cost is the optimization result. In one implementation, the relative pose optimizer 638 uses the POSIT algorithm to recover the relative pose from 2D-to-3-D point matches. In yet another implementation, to recover the pose the minimum number of point pairs is four. The relative pose optimizer 638 can refine the final pose by applying a standard orthogonal iteration method on inlier point pairs.

Geometrically Constrained Feature Matching

In one implementation, feature matching engine 608 maximizes probability in Equation (24) (e.g., step 3 above performed by the ICM engine 614) by minimizing a cost function 628, which in one implementation is simply the negative log of the posterior in Equation (24), as shown here in Equation (27):

$$C(P_2) = \sum_i e_i^2 + \lambda \sum_i f_i^2 \quad (27)$$

In one implementation, the constrained feature matching engine 624 can perform the minimization in Equation (27) in image $I_2$, as shown in the feature matching 704 of FIG. 7. With known R, T, the feature pre-warp engine 632 can pre-warp the feature image in $I_1$ to the position in image $I_2$. Then the multiscale block matcher 622 performs block matching starting from $\vec{P}_2^{(i)}$ using Equation (27) as matching cost. Since the multiscale block matching is done approximately over integer image coordinates, no image interpolation is required.

Bayesian Online Key-Frame Fusion

The online key-frame fusion engine 606 infers the current pose $X_t$ 502 based on the inter-frame motion estimation of the inter-frame motion iterator 602. Since Equation (19) gives the joint distribution of the dynamical graphical model 300 of the Bayesian network, the posterior distribution of the current pose $X_t$ 502 is written, based on Equation (19). In one implementation, the online key-frame fusion engine 606 embodies some assumptions specific to the task of pose tracking.

MAP Estimation of the Current Pose

Some exemplary definitions are now provided to introduce the pose inference engine 604, that is, a composition operator (∘), a differentiation operator (~), and a distance measure associated with a pose are now defined. In one implementation, the pose inference engine 604 uses a quaternion representation of rotation, so that $X_1 = (q, t) = (q_0, q_1, q_2, q_3, t_1, t_2, t_3)$, and $X_2=(r, s)=(r_0, r_1, r_2, r_3, s_1, s_2, s_3)$, where q, r is the quaternion representation of rotation and t, s is the translation vector. Equations (28), (29), and (30) then define:

$$X_1 \cdot X_2 = (q \wedge r, R(q) \cdot s + t), \quad (28)$$

$$X_1 \sim X_2 = (q \wedge \bar{r}, t - R(q \wedge \bar{r}) \cdot s), \quad (29)$$

$$d(X_1, X_2) = \frac{\|y\|^2}{\sigma_r^2} + \frac{\|t - s\|^2}{\sigma_t^2}, \quad (30)$$

where, $\wedge$ is the quaternion multiplication operator, $\bar{r}$ is the conjugate of r, R(q) is the rotation matrix represented by the quaternion q, y is the vector part of $q \wedge \bar{r}$ and $\sigma_r$, $\sigma_t$ are parameters to normalize the dimension size of rotation and translation respectively.

In one implementation, three assumptions are made to simplify the estimation of the current pose $X_t$ 502. The three assumptions are:
1. The inter-frame pose $\delta_i^t$ 308 representing the relative pose between pose state $Y_i$ 310, and object state (current pose) $X_t$ 502 is regarded as a hidden state related to current pose $X_t$ 502 so that the MAP state of the current pose $X_t$ 502 is obtained through maximization of the joint distribution of $P(Xt, \{\delta_t^i\})$.
2. The poses of the key-frames are well-estimated; their pose states are unimodal and have very small variance.
3. The density of inter-frame pose $\delta_i^t$ 308 is specified by feature matches that maximize the joint distribution of inter-frame motion, which corresponds to $P(\delta_i^t|X_t, Y_i) \approx P(\delta_i^t|M_i, \hat{P}_i^t)$.

In assumption 3, $(\delta_i^t|M_i, \hat{P}_i^t)$ is a symbol set for the i-th key frame for time t which corresponds to $([R|T], M_1, P_2)$ in the inter-frame motion case, and $P(\delta_i^t|M_i, \hat{P}_i^t)$ is specified in Equation (21), where $(\hat{P}_i^t, \hat{\delta}_i^t) = \arg\max_{P_i^t, \delta_i^t} P(P_i^t, \delta_i^t|I_{t,i}, I_t, M_i)$. This assumption indicates that pose state $Y_i$ 310 fully determines $M_i$ and $X_t$ determines $\hat{P}_i^t$.

With the three assumptions just described, then from Equation (19), the formulation of the MAP estimation of the current pose $X_t$ 502 is shown by Equation (31):

$$\hat{X}_t \approx \arg\max \int_{\{Y_i\}} P(X_t, \{Y_i\}, \{\delta_t^i\}, I_t) d(\{Y_i\}) \quad (31)$$

$$\approx \arg\max P(X_t | \{\hat{Y}_i\}) P(I_t, \{I_{t,i}\} | X_t, \{\hat{Y}_i\}, \{\delta_t^i\})$$

$$\prod_{i=o}^{n} P(\{\delta_t^i\} | M_i, \hat{P}_i^t).$$

The first approximation in Equation (31) corresponds to assumption 1, the second approximation corresponds to assumptions 2 and 3. Since the temporal distance between the current frame and the key-frame is large and the prediction is then difficult, the dynamical model can accordingly be put on hold, in favor of Equation (32). Since current pose $X_t$ 502 is a composition of $Y_i$, $\delta_i^t$, the current pose MAP estimator 652 can approximate Equation (31) as:

$$\hat{X}_t = \arg\max Q(X_t) \quad (32)$$

$$= \arg\max(\ln(P(I_t, \{I_{t,i}\} | X_t, \{\hat{Y}_i\})) +$$

$$\sum_{i=o}^{n} \ln(P(X_t \sim \hat{Y}_i | M_i, \hat{P}_i^t)))$$

There are two terms of interest in Equation (32). Appearance correspondence engine 648 models the first term, which corresponds to the likelihood of image appearance correspondence given the pose estimate, which is modeled based on the appearance constraint specified in Equation (25) over semantic object features, with a small displacement relaxation. The relative pose density engine 650 models the second term, which corresponds to the density of relative pose, given the feature point (non-semantic) matching. This second term is evaluated if the relative pose is estimated, with each term in this evaluation function having the same form as specified in Equation (21), which finally depends on the geometric constraint in Equation (23).

Finally, the stochastic sampling optimizer 654 obtains the MAP estimate of current pose $X_t$ 502 in Equation (32). First, the stochastic sampling optimizer 654 generates sample candidates of current pose $X_t$ 502 from an importance distribution in the form of a Gaussian centered at $(\hat{\delta}_0^t \circ Y_0)$. Then Equation (32) is evaluated and each sample given a resulting weight. The sample with the highest weight is output by the current pose MAP estimator 652 as the MAP estimation result. From another perspective, candidate samples of the current pose $X_t$ 502 are obtained from a proposal distribution, and the proposal distribution is evaluated via Equation (32) to get its MAP states. The proposal distribution is obtained by obtaining the MAP estimation of inter-frame differential pose states and the evaluation function is obtained once the MAP estimation of inter-frame feature matching is obtained from the inter-frame motion iterator 602.

Exemplary Key-Frame Selection

The choice of key-frames can affect the presented assumptions that the poses of key-frames are well-estimated, their pose states are unimodal and have very small variance, i.e., that their distribution is unimodal and peaks around their MAP states. So the model key-frame accumulator 644 selects key-frames that have high confidence from previously tracked frames. $Q(X_t)$ in Equation (32) specifies such a confidence. If confidence evaluator 646 determines that $Q(\hat{X}_t)$ is larger than a threshold, key-frame accumulator 644 adds the frame corresponding to current pose $X_t$ 502 as a key-frame to the key-frame pool 636.

Key-frame selector 634 can select the best key-frames from the key frame pool 636 for the current frame's pose estimation (i.e., the best key-frames for the current frame are selected before the pose estimation of the current frame). The choice of the best key-frames for the current frame depends on the difference in pose between the key-frame and the current frame and on and the temporal distance between the key-frame and the current frame. The difference in pose may affect the result of inter-frame motion estimation, while the difference in temporal distance may affect the drift of using the key-frame itself Error accumulation is quite large during online tracking if there is no key-frame constraint. The online key-frame fusion engine 606 uses key frames to minimize drift error.

In one implementation, difference in pose between a key-frame and current frame is ideally as small as possible and temporal distance between the key-frame and the current frame is ideally as large as possible. Equation (33) defines a measure to reflect these two ideals:

$$m(Y)=\exp(-d(Y,\hat{X}_{t-1}/\sigma^2)\exp(-n_0/\min(n_0,n_x-n_y)) \quad (33)$$

where, $\hat{X}_{t-1}$ is the estimated pose of the previous frame, $n_x$ and $n_y$ are the temporal frame index of the current frame and the key-frame respectively, and $n_0$ is a parameter to control the temporal difference between the selected key-frame and the current frame. The key-frame selector 634 constructs a set that includes key-frames with the largest measures or key-frames that are within the specified pose distance from current pose. Then the key-frame selector 634 selects several key-frames from the above set that have maximal temporal distance to the current frame.

Digital effects module 116 uses these final pose tracking determinations to render a 3-D feature over the foreground object on a frame-by-frame basis. Specifically, after the pose tracking, the pose of foreground object has been determined (e.g., a position and 3D rotation of a face). The position and 3D rotation is applied to a virtual object (e.g., a pair of sunglasses, etc.) and then the virtual object is rendered onto the original video frame.

An Exemplary Procedure

Figure 8:
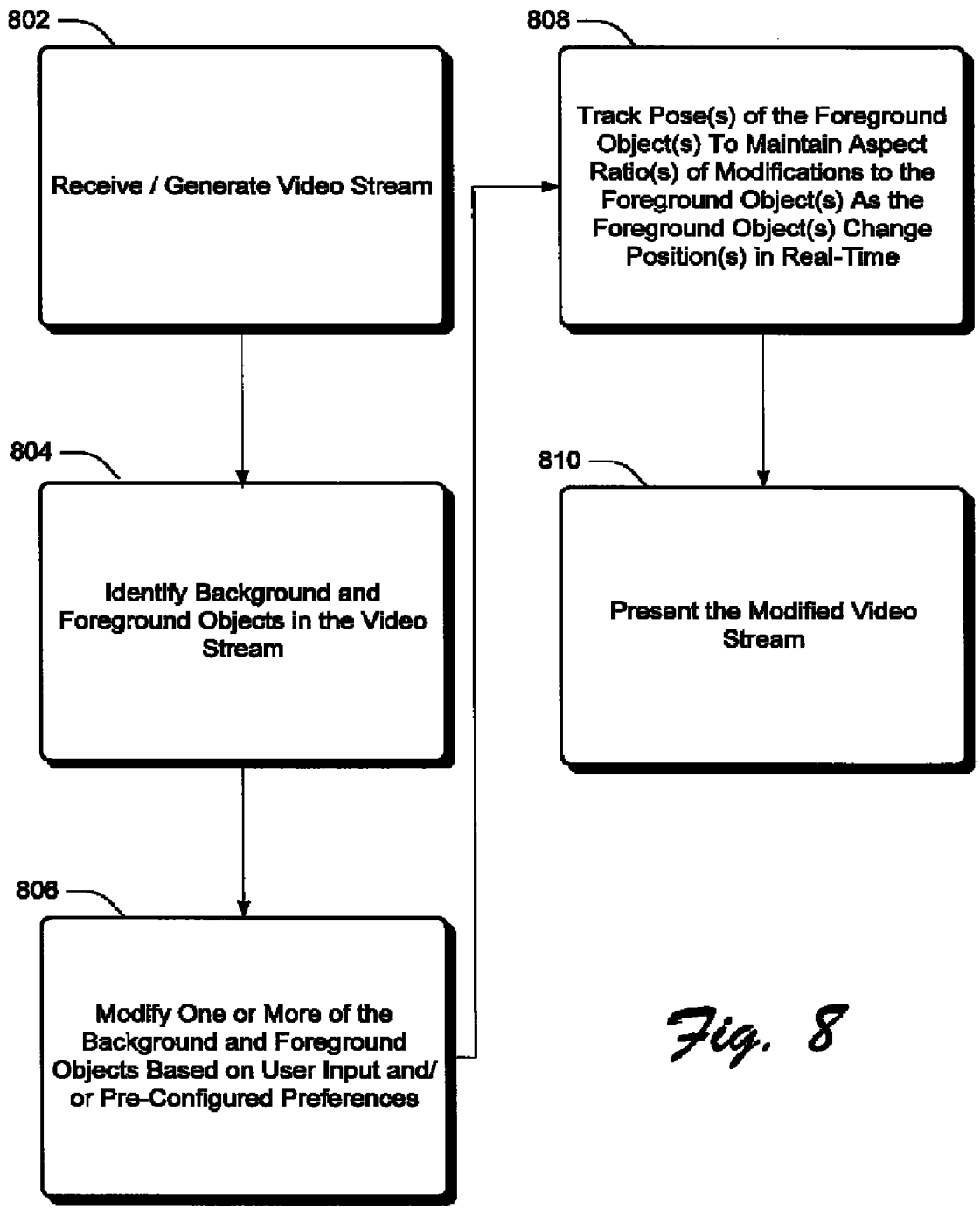
FIG. 8 shows an exemplary procedure for adding digital video effects to a video stream, according to one embodiment.

FIG. 8 shows an exemplary procedure 800 for adding digital video effects to a video stream, according to one embodiment. For the purposes of exemplary illustration and description, the operations of procedure 800 are described with respect to components of FIG. 1, although the exemplary operations of procedure 800 are not limited to such components and/or architecture. Additionally, although operations of procedure 800 are shown in a particular order, it can be appreciated that operations associated with any particular block 802 through 810 can be implemented before/or after operations associated with any different block.

Block 802 receives (or generates) video stream 120 (FIG. 1) having image frames. In one implementation, digital effects module 116 receives video stream 120 from a remote computing device 106. In another implementation, video stream 120 is not received by digital effects module 116, but merely stored-on, or otherwise remotely accessible, by computing device 102 for access by digital effects module 116. Block 804 evaluates or filters video stream 120 to identify (separate) background and foreground objects in respective image frames of video stream 120. In one implementation, filter module 130 filters video stream 120 to identify background objects 128 and foreground objects 126.

Block 806 modifies one or more of background objects 128 and foreground objects 126. In one implementation, background modification module 132 modifies one or more background objects 128 based on user input and/or preconfigured preferences for background modification. For example, in one implementation, background modification module 132 presents a UI to the user for the user to select one or more options to modify a background object 128. An exemplary such digital video effects UI is shown with respect to UI 200 of FIG. 2. In one implementation, 3-D visual feature addition module 134 modifies a foreground object 126 with 3-D visual features 138 based on user input and/or preconfigured preferences for foreground object modification. In one implementation, for example, 3-D visual feature addition module 134 presents digital video effects UI to the user for the user to select one or more options to modify a foreground object 126 (e.g., by rendering a 3-D visual feature over the foreground object). An exemplary such digital video effects UT is shown with respect to UI 200 of FIG. 3.

Block 808 tracks poses of identified foreground objects 126 in video stream 120 to maintain aspect ratios of modifications (e.g., overlain 3-D visual features 138) to the foreground objects as the foreground object change position in real-time. In one implementation, digital effects module 116, or 3-D visual feature addition module 134, employs operations of 3-D pose tracking engine 140 to track poses of a moving foreground object 126 across respective image frames of video stream 120. Block 810 presents the modified video stream 120 to one or more users. In one implementation, the modified video stream is communicated to a device for presentation to the one or more users.

CONCLUSION

Although systems and methods for digital video effects have been described in language specific to structural features and/or methodological operations or actions, it is understood that the implementations defined in the appended claims are not necessarily limited to the specific features or actions described. For example, in one implementation computing device 102 or a remote computing device 106 provides a networked service that users of other computing devices utilize to provide the above described digital video effects during communication sessions. Accordingly, the specific features and operations presented with respect to FIGS. 1 through 8 are disclosed as exemplary forms of implementing the claimed subject matter,

The invention claimed is:

1. A method at least partially implemented by a computing device, the method comprising:
   identifying a foreground object in a video stream comprising multiple image frames;
   rendering a three-dimensional (3-D) visual feature over a portion of the foreground object to add a digital video effect to the video stream and generate a modified foreground object;
   tracking each pose of the foreground object in 3-D space across the multiple image frames by;
      iteratively refining estimations associated with a first and a second conditional distributions in a joint distribution of a Bayesian network that models the foreground object, the first conditional distribution comprises a distribution of a relative pose given correspondences between 3-D model points and two-dimensional (2-D) features of the foreground object, the second conditional distribution comprises a distribution of matching features of the visual object between two frames of the video sequence given the 3-D model points and a relative pose estimation associated with the first conditional distribution; and
      using a Bayesian fusion of the iteratively refined estimations to obtain a current pose of the foreground object, wherein the iteratively refined estimations include an iteratively refined relative pose estimation and an iteratively refined feature matching estimation; and
   maintaining rendered aspect ratios of the 3-D visual feature in correspondence with aspect ratios of a remaining portion of the foreground object as the foreground object changes pose in respective ones of the image frames.

2. The method of claim 1, wherein the video stream is associated with a communication session between at least two users.

3. The method of claim 1, wherein the method is a networked service provided to one or more users of one or more remote computing devices.

4. The method of claim 1, wherein tracking the pose further comprises tracking facial features to identify rotational and translational vectors across respective ones of the image frames; and wherein the method further comprises rendering the 3-D visual feature over the portion of the foreground object based on the rotational and translational vectors.

5. The method of claim 1, further comprising presenting a user interface to a user for the user to select at least the 3-D visual feature.

6. The method of claim 1, further comprising presenting a modified video stream comprising the modified foreground object to one or more users.

7. The method of claim 1, further comprising:
identifying a background from one or more of the image frames;
modifying the background to generate a modified background, the modifying being independent of any modification to the foreground object; and
wherein the modifying adaptively modifies the background responsive to one or more of background changes and detected camera shake across respective ones of the image frames.

8. The method of claim 7, further comprising presenting a user interface to a user for the user to select a modification to apply to the background.

9. The method of claim 8, wherein modifying the background comprises selectively blurring the background, replacing the background with an image, or replacing the background with an animation.

10. The method of claim 8, further comprising presenting a modified video stream to one or more users, the modified video stream comprising the modified background and the modified foreground object.

11. A computing device comprising:
a processor; and
a memory coupled to the processor, the memory comprising computer-program instructions executable by the processor for:
generating a video stream comprising a 3-D image of a first person involved in a video communication session with a second person using a remote computing device;
separating a foreground object representing the 3-D image from a background of the video stream based on differences between color and contrast attributes of pixels of the foreground object and color and contrast attributes of pixels of the background;
refining boundaries between the foreground object and the background by adaptively attenuating a background contrast while preserving contrasts across the boundaries;
adaptively rendering a 3-D feature over particular ones of multiple video frames that comprise the foreground object in multiple translational and rotational poses to generate a modified video stream, the 3-D feature being rendered over a portion of the 3-D facial features of the first person such that aspect ratios of the 3-D feature are maintained in correspondence with aspect ratios of a remaining portion of 3-D facial features in view of the translational and rotational poses; and
communicating the modified video stream to the remote computing device for presentation to the second person.

12. The computing device of claim 11, further comprising determining the 3-D feature from a set of pre-configured user preferences.

13. The computing device of claim 11, further comprising:
presenting a user interface to the first person, the user interface comprising a video effects area that provides one or more selectable costume options to the first person;
responsive to the first person selecting a particular one option of the one or more selectable costume options, setting the 3-D feature to the particular one option.

14. The computing device of claim 13, wherein the user interface further comprises a first display area for presenting an image of the first person and a second display area for presenting an image of the second person, the user interface being used by the first and second person for real-time communications between the first and the second person, the image of the first person being a modified image overlain with the 3-D feature responsive to user input, the modified image representing what is viewed by the second person during the real-time communications.

15. The computing device of claim 11, further comprising:
dynamically altering the background to adapt to changes to the background across respective ones of the frames and translational and rotational movement of the foreground object, the dynamic altering generating modified background frames; and
wherein the modified video stream comprises the modified background frames.

16. The computing device of claim 15, further comprising:
presenting a user interface to the first person, the user interface comprising a video effects area that provides one or more selectable background modification options to the first person; and
responsive to the first person selecting a particular one option of the background modification options, applying the particular one option to adaptively modify the background across respective ones of the frames that represent the background, the modified video stream comprising such adaptive background modifications.

17. The computing device of claim 16, wherein the user interface further comprises a first display area for presenting, responsive to user input, the modified video stream, the modified video stream representing what is viewed by the second person during the real-time communications.

18. A tangible computer-readable storage medium comprising computer-program instructions executable by a processor, the computer-program instructions, when executed by the processor, for performing operations comprising:
providing a user with one or more video stream background modification options;
presenting the user with one or more costume overlay options;
responsive to selection by the user of a particular background modification option of the video stream background modification options, adaptively modifying background of a video stream using the particular background modification option;
responsive to selection by the user of a particular costume overlay option of the costume overlay options, adaptively rendering a 3-D visual feature associated with the costume overlay option over a portion of a foreground object in frames that comprise the video stream, the portions being parts of facial features;
maintaining aspect ratios of the 3-D visual features in correspondence with aspect ratios of a remaining portion of the foreground object as the foreground object changes translational or rotational position in the frames; and
communicating the video stream to a remote computing device for presentation to a different user.

19. The tangible computer-readable storage medium of claim 18, wherein the computer-program instructions further comprise instructions for presenting a different video stream to the user, the different video stream showing an image of the different user that has been altered with one or more 3-D visual features that follows 3-D translational and rotational movement of the different user across respective frames of the different video stream.

20. The tangible computer-readable storage medium of claim 19, wherein the different video stream further comprises an adaptively altered background that is blurred or replaced as per input from the different user, the altered background being adapted to allow for translational and rotational movement of the different user across respective frames of the different video stream.

\* \* \* \* \*